United States Patent Office 2,983,198
Patented May 9, 1961

2,983,198
THREE-DIMENSIONAL CAM REPRODUCING MACHINE

George Churchill, Brooklyn, N.Y., assignor to Sperry Rand Corporation, Great Neck, N.Y., a corporation of Delaware Filed Dec. 17, 1958, Ser. No. 781,165
4 Claims. (Cl. 90—13.7)

The present invention relates to machines for the reproduction of three-dimensional cams from a master cam and, more particularly, to such a machine facilitating a high degree of accuracy of reproduction.

In cases where substantial degrees of accuracy are required of the data stored on complex-contoured three-dimensional cams, some prior art practice has been to first fabricate a master cam which is enlarged with respect to the work-piece or reproduced cam. The use of an enlarged master cam facilitates the hand operations in the production of its relatively complex surface contours. Customary practice, however, has been to maintain the same predetermined ratio (enlargement factor) between the axial lengths of the master cam and the work-piece, between the nominal diameters of the master cam and the work-piece, and between the lift of the master cam and the lift of the work-piece. For the purpose of the present discussion, "nominal diameter" is defined as the diameter of an imaginary cylinder coaxial with and contained within the cam. Lift is measured radially outward from the circumference of the imaginary cylinder to the surface of the cam. Although the hand operations in the fabrication of the master cam are simplified to a degree by enlarging the master cam in accordance with said predetermined ratios, no improvement in accuracy of reproduction is achieved. That is, the ability of the master cam follower to accurately sense surface contour variation of the master cam (and thereby to better control the positioning of the work-piece cutter) is not enhanced.

Additionally, prior art practice has been to impart constant rotational speed to the master cam and the work-piece, irrespective of variations in the rate at which the surface area of the work-piece passes in front of the work-piece cutter. The inevitable result of such practice is that in those areas where it is necessary to cut steep surface slopes or to provide a number of surface slope variations in the work-piece, the cutter must proceed across the surface of the work-piece at a faster rate than it would normally assume during the traversal of a surface of regular contour. Consequently, non-uniformity of surface-finish results on the work-piece.

Other usual practice includes the mounting of the master cam and the work-piece on respective rotating arbors which are interconnected by means of gear trains. Where the master cam and work-piece arbors are nominally parallel, the longitudinal axes of the gears on the end of the arbors tend to deviate under load from their normal positions causing angularity errors between the generated contour of the work-piece and that of the master cam.

It is the principal object of the present invention to avoid and overcome the foregoing and other disadvantages of prior art cam reproducing machines by the provision of means eliminating the gear train drive between the master cam and work-piece arbors, by means for regulating the surface cutting speed of the work-piece cutter as a function of the corresponding contour of the master cam, and by the provision of means adapted to fabricate a work-piece cam from an enlarged master cam whose axial length, lift and nominal diameter, relative to those of the work-piece, are each definable in terms of a unique ratio.

These and other objects of the present invention, as will appear to those skilled in the art from a reading of the following specification, are achieved in a preferred embodiment by the provision of a cam reproducing machine having common axis arbors upon which the master cam and work-piece are mounted, a main carriage for translating both the master cam follower and work-piece cutter at right angles to the axis of the common arbor, and means for varying the speed of the prime mover, which rotates the common axis arbors, in conformity with the surface contour of the master cam. The main carriage is additionally provided with two subcarriages for displacing the master cam follower and the work-piece cutter at separate rates in a direction at right angles to the movement of the main carriage and parallel to the common axis of the arbors.

For a clearer understanding of the present invention, reference should be had to the following specification and to the appended drawings, of which:

Figure 1:
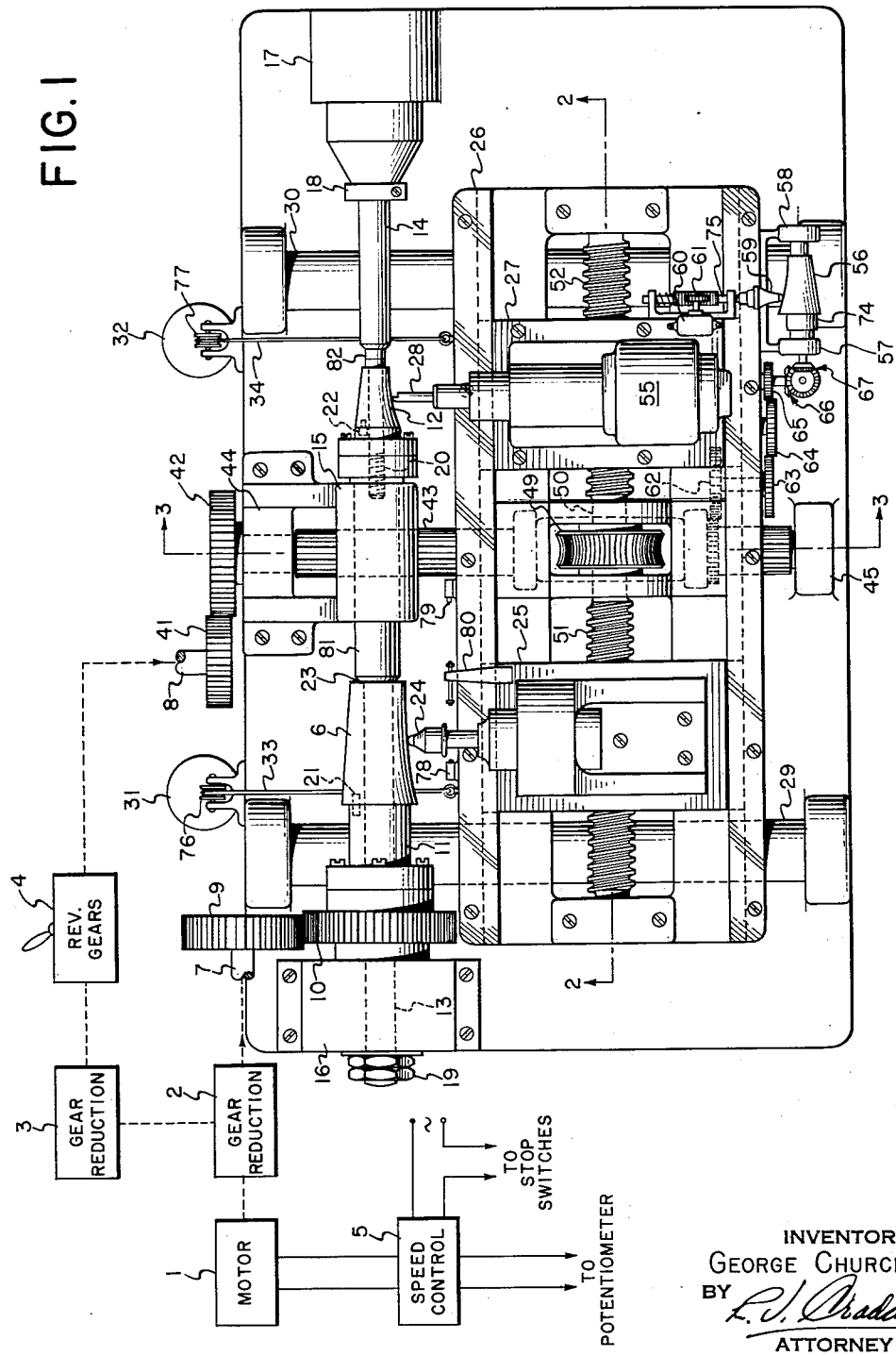
Fig. 1 is a simplified plan view of a preferred embodiment of the present invention.

In the plan view of Fig. 1, the prime moving apparatus per se, not being an integral part of the present invention, is generally represented by the series of blocks 1, 2, 3, 4, and 5. Speed control 5 varies the rotational speed of motor 1 in conformity with the surface contour of master cam 6, as will be described hereinafter. Motor 1 drives the two input shafts 7 and 8 of the cam reproducer via respective mechanical connections. Reduction gear 2 couples motor 1 to shaft 7. Reduction gears 2 and 3 and reversing gears 4 couple motor 1 to shaft 8.

Shaft 7 drives gears 9 and 10 to rotate shaft 11 comprising the common axis arbors along which master cam 6 and work-piece 12 are fastened. Shaft 11 is suitably supported at opposite ends 13 and 14 by bearing mounts 16 and 17 as well as at approximately its center position by center-stock assembly 15. Shaft 11 is secured against longitudinal movement by clamp 18 and nuts 19. For convenience in the changing of work-pieces, shaft 11 is divided into first and second arbor portions 81 and 82 which are secured together in tandem and along a common axis of revolution by means of screw 20. Screw 20, an integral part of the right-hand portion 82 of shaft 11, engages a correspondingly threaded recess in the left-hand portion 81 of shaft 11.

Master cam 6 and work-piece 12 are slidably mounted on shaft 11. The entire shaft 11 may be withdrawn through centerstock assembly 15 and bearing support 16 upon the removal of nuts 19, the disengagement of screw 20 and the release of clamp 18. Master cam 6 and work-piece 12 are caused to rotate synchronously with shaft 11 by means of keys 21 and 22, respectively. Upon the insertion of shaft 11 in bearing mount 16 and center-stock assembly 15, and upon the positioning and keying of master cam 6 and work-piece 12 thereto, clamp 18 and nuts 19 may be tightened thereby pressing shoulder 23 against the right-hand face of master cam 6. This further secures master cam 6 and causes it to rotate with the shaft 11.

The surface contour of master cam 6 is sensed by follower 24 which is mounted on and positioned by subcarriage 25 in turn carried by main carriage 26. A second subcarriage 27 positions cutter 28 which machines the surface of work-piece 12 in conformity with the contour of master cam 6. The ratio between the nominal diameters of follower 24 and cutter 28 is not necessarily the same as the ratio between the axial lengths of master cam 6 and work-piece 12.

Main carriage 26 is slidably mounted on and guided by rails 29 and 30. Main carriage 26 is caused to move at right angles to the axis of shaft 11 by means of weights 31 and 32 secured to main carriage 26 by flexible cables 33 and 34, respectively. The downward force of weights 31 and 32 is redirected along a horizontal by pulleys 76 and 77 to press follower 24 into constant force contact with the surface of master cam 6. Subcarriages 25 and 27 are mounted so as to preclude relative movement in a direction perpendicular to the axis of shaft 11. Thus, the lift of master cam 6 equals the lift of work-piece 12 at corresponding points along the respective surfaces of master cam 6 and work-piece 12.

Figure 3:
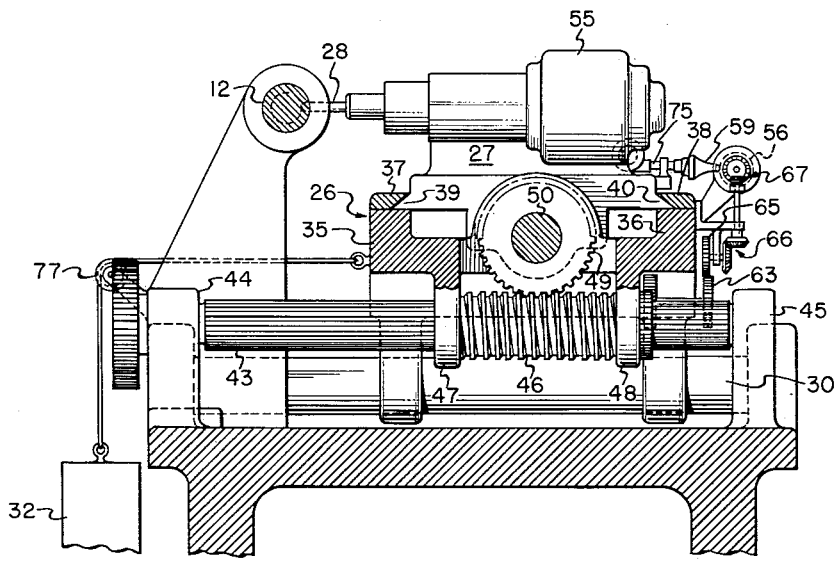
Fig. 3 is an elevational view, partly in cross section, taken along the axis 3—3 of Fig. 1.

Subcarriages 25 and 27 are similarly mounted; the mounting arrangement of subcarriage 27 is shown in Fig. 3. As shown in Fig. 3, the main carriage 26 includes two rail members 35 and 36, each of which has a respective grooved portion 37 and 38 extending longitudinally along the rails. Subcarriage 27 includes lip portions 39 and 40 which ride in grooves 37 and 38, respectively. In this way, subcarriages 25 and 27 are slidably mounted on main carriage 26 to permit the movement of the subcarriages in a direction parallel to the axis of shaft 11.

The displacements of subcarriages 25 and 27 along main carriage 26 is governed by the rotation of input shaft 8 of Fig. 1. Input shaft 8 drives gears 41 and 42 in turn rotating spline shaft 43. Spline shaft 43 is suitably supported at opposite ends by bearing mounts 44 and 45 shown in Fig. 3. Worm 46 is slidably mounted on spline shaft 43, the worm 46 being rotatably secured at opposite ends by bearing mounts 47 and 48 affixed to main carriage 26. Thus, as main carriage 26 is moved in a direction at right angles to the axis of shaft 11 by the constant force exerted by weights 31 and 32, worm 46 is displaced correspondingly along spline shaft 43 while always rotating in fixed relationship therewith.

The rotary motion of worm 46 turns worm gear 49 which is rotatably supported by main carriage 26. Worm gear 49, in turn, is affixed to lead screw 50 so that lead screw 50 rotates in synchronism with the angular motion of worm gear 49. Lead screw 50 is threaded along portions 51 and 52 at two different pitches.

In the view of Fig. 1, the pitch of portion 51 is twice that of the pitch of portion 52 so that with a given rotation of worm gear 49, subcarriage 25 is caused to translate along a line parallel to the axis of shaft 11 at twice the rate of the corresponding translation of subcarriage 27. Such motion is in conformity with the 2:1 longitudinal ratio between master cam 6 and work-piece 12. The result is that when follower 24 and cutter 28 are initially placed at the respective left-hand edges of cam 6 and work-piece 12, follower 24 and cutter 28, after a certain displacement, will assume respective central positions on master cam 6 and work-piece 12 at the same time, as shown in the view of Fig. 1. Similarly, follower 24 and cutter 28 will also reach the respective right-hand edges of master cam 6 and work-piece 12 at the same time. Limit stop switches 78 and 79 are actuated by member 80, affixed to subcarriage 25, when the respective extreme positions of subcarriage 25 are reached. The actuation of either of switches 78 or 79 de-energizes prime mover 1.

Figure 2:
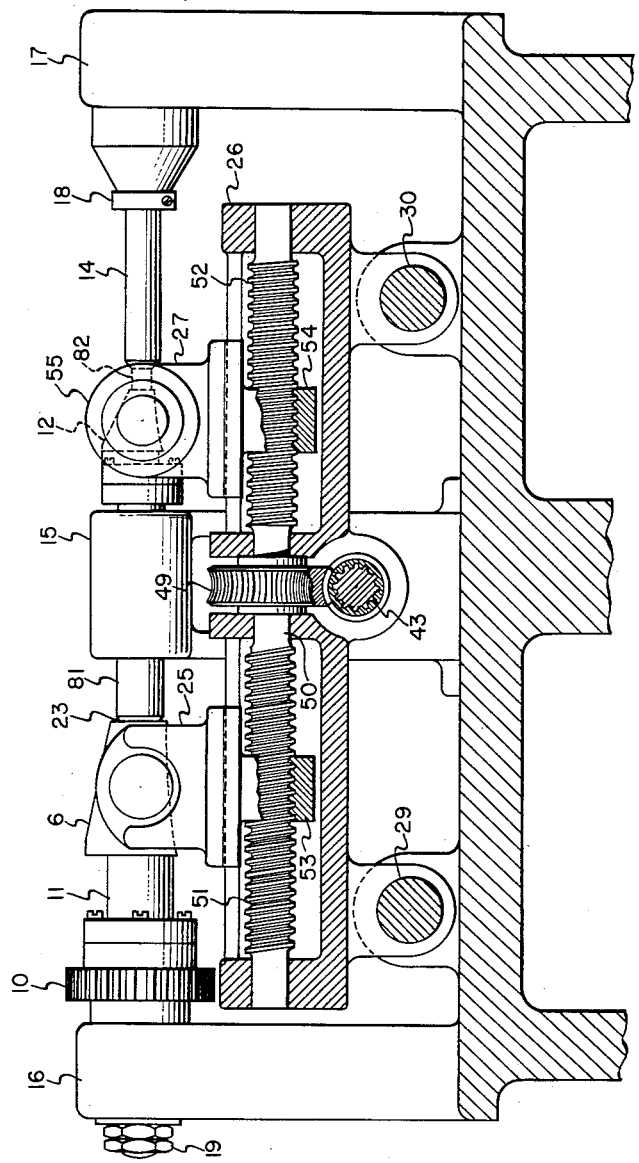
Fig. 2 is an elevational view, partly in cross section, taken along the axis 2—2 of Fig. 1.

The rotation of portion 51 of lead screw 50 imparts movement to subcarriage 25 along the line parallel to the axis of shaft 11 by means of nut 53 fixed to subcarriage 25, as shown in Fig. 2. Similarly, the rotation of portion 52 of lead screw 50 causes corresponding displacementt of subcarriage 27 by means of nut 54 secured to subcarriage 27.

Cutter 28 is ortated at a suitable constant speed by motor 55 mounted on subcarriage 27. Although cutter 28 rotates at constant speed, the rate at which the surface of work-piece 12 is machined, irrespective of contour variations thereof, is held substantially constant by varying the speed of prime mover 1 in a manner now to be described.

The speed of rotation of motor 1 is governed by the surface contour of control cam 56. Cam 56 is mounted on arbor 74 and is rotatably supported by bearing mounts 57 and 58 which in turn are fastened to main carriage 26, as shown in Figs. 1 and 3. The lift contour of control cam 56, generally resembling that of the finished work-piece, is monitored by follower 59 whose axial movement of shaft 75 varies the setting of potentiometer 60 by means of rack and pinion 61. Control cam 56 is rotated in one-to-one synchronism with the rotation of common-axis arbor 11 by means of gears 62, 63, 64, 65, 66, and 67 driven by spline shaft 43. Potentiometer 60 adjusts speed control 5 to vary the speed of motor 1 in accordance with the lift contour of cam 56. In this way, the rotation of arbor shaft 11 is automatically slowed, for example, when points of high lift are being cut on the work-piece so as to keep the surface speed of the work-piece relative to cutter 28 substantially constant for a uniform finish. Additionally, localized surface areas may be built up on control cam 56 to in turn retard the rotation of work-piece 12 along corresponding surface locations thereby facilitating the milling of variously shaped reference detents on the work-piece.

From the preceding, it can be seen that the apparatus so far described is adapted to rotate a master cam and a work-piece along common-axis arbors with subcarriages being provided for the support of the master cam follower and the work-piece cutter, respectively, whereby a 1:1 lift ratio is preserved between the master cam and the work-piece while permitting a 2:1 ratio between the axial lengths of the master cam and work-piece.

Figure 4:
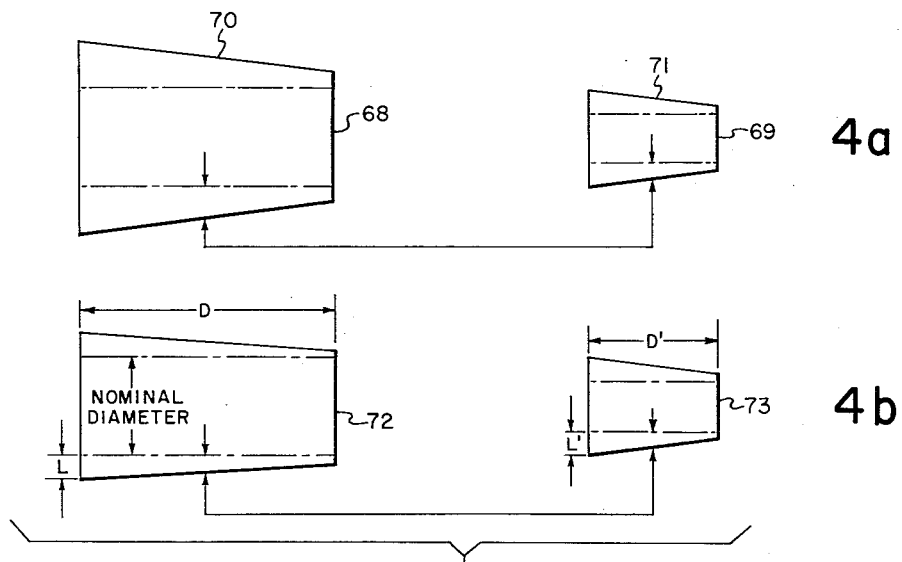
Fig. 4 is a series of cam profiles useful in explaining the variable dimensional ratio feature of the present invention.

The advantage of providing a lift ratio between the master cam and the work-piece which is different from the axial length ratio may be understood with the aid of Fig. 4. Fig. 4A illustrates the prior art practice of providing for an enlarged master cam 68, relative to a work-piece 69, wherein a predetermined ratio is maintained between the lifts, axial lengths, and nominal diameters of the master cam and the work-piece. In other words, master cam 68 represents a simple enlarged version of work-piece 69. As a result of said fixed ratio, the profile slope of surface 70 of master cam 68 is identical to the profile slope of surface 71 of work-piece 69. Consequently, there is no enhancement in the ability of a follower to accurately monitor the surface contour of master cam 68 simply by virtue of the enlargement thereof.

As is well decognized, the ability of a follower to faithfully detect cam surface contour is a function of the slope of the cam surface. That is, the side thrust acting on a follower which tends to deflect the follower at right angles to the axis of its supporting shaft, increases as the angle between the surface of the cam and the axis of the follower shaft decreases from 90°, the deflecting force being zero when said angle is 90°. One of the principal features of the present invention, attributable to the use of different ratios between the master cam and the work-piece, is that the slope of the master cam and hence the deflecting force acting on the master cam follower is reduced.

This can be seen in the cam outlines of Fig. 4B. It will be observed that master cam 72 has the same lift L as that (L') of work-piece 73, the ratio between the two being 1:1. On the other hand, the longitudinal dimension D of master cam 72 is greater than that (D') of work-piece 73. As a result of maintaining a 1:1 lift ratio between the master cam and the work-piece, as shown in Fig. 4B, that linkage mechanism employed in the prior art to impart a lift ratio other than unity to the master cam follower and the work-piece cutter is eliminated requiring only the retention of means to impart different longitudinal movement to the master cam follower and the work-piece cutter consistent with the non-unity ratio between the axial lengths of the master cam and the work-piece.

It should be noted that in addition to eliminating the variable lift mechanism of the prior art by the maintenance of a unity lift ratio, the present invention makes possible a decrease in the slope of the enlarged master cam whereby follower action is enhanced. As previously mentioned in connection with the prior art arrangement of Fig. 4A, the profile slope of master cam 68 is identical with that of work-piece 69 so that not only must variable lift ratio means be provided in the corresponding cam reproducer but also no improvement in the accuracy of the follower operation is realized.

Figure 5:
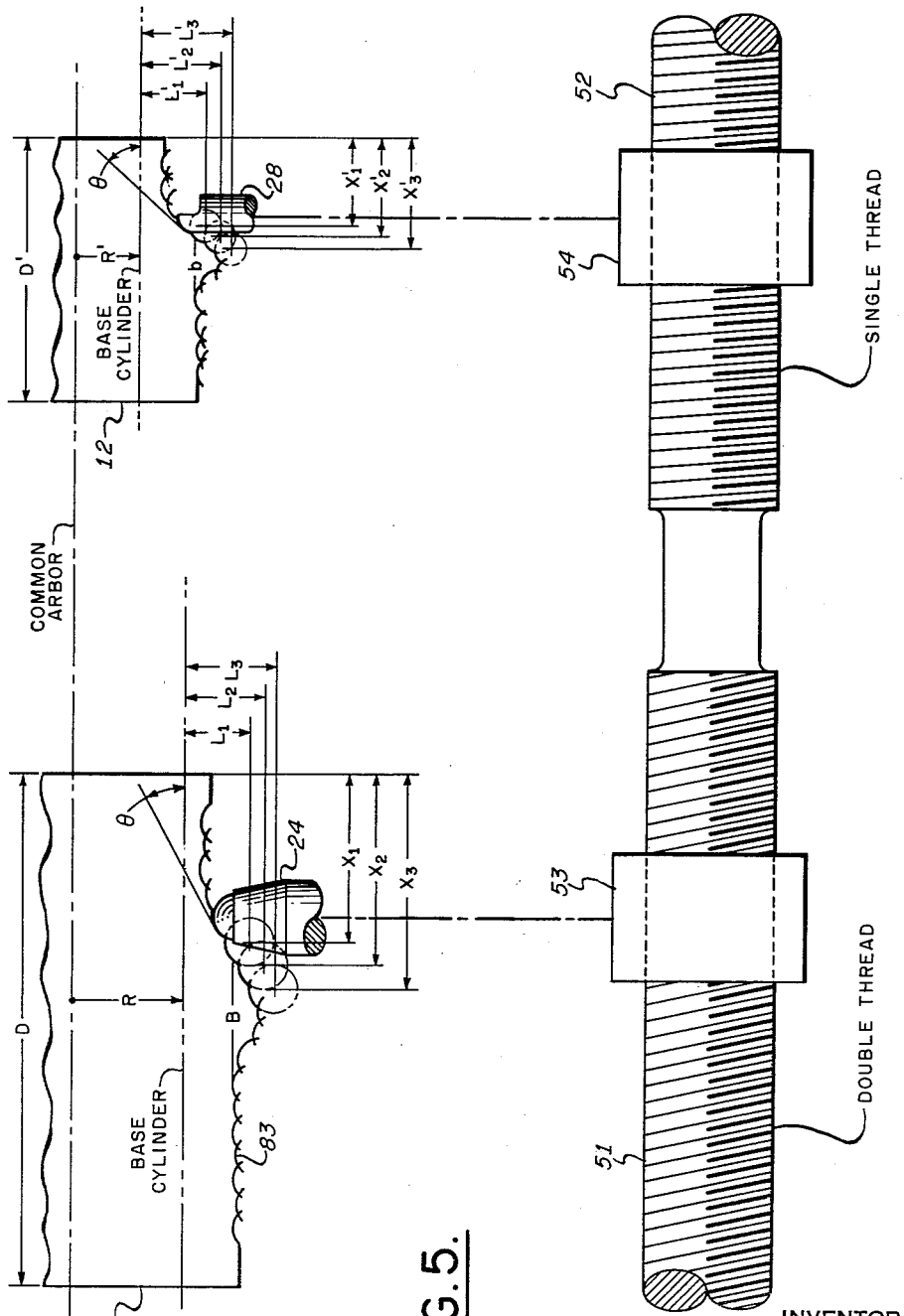
Fig. 5 is a simplified representation of the apparatus of Fig. 1, showing typical master cam and work-piece surface contours determined in accordance with the present invention.

A typical master cam 6 and the resulting work-piece 12 produced in accordance with the present invention are shown in Fig. 5. The cam outlines of Fig. 5 correspond generally to those of Fig. 4B with the exception that a specific representative master cam surface contour 83 is depicted in Fig. 5 rather than the simplified straight line contour shown in Fig. 4. The remainder of Fig. 5 is a simplified representation of the lead screw arrangement shown in Fig. 1 for positioning follower 24 and cutter 28. In Fig. 5, the axial lengths of the master cam and work-piece are respectively designated D and D', the nominal diameters are proportional to radii R and R', and the lift dimensions of the master cam and work-piece are respectively designated L and L'. The following illustrative ratios obtain: $L:L'=1:1'$, $D:D'=2:1$, $R:R'=7:4$.

By inspection of Fig. 5 it can be seen that the slope of master cam contour 83 is reduced relative to the corresponding contour of work-piece 12. In the positions shown for follower 24 and cutter 28, the surface slope of master cam 6 is represented by the angle $\theta$ whereas the corresponding surface slope of work-piece 12 is represented by the larger angle $\theta'$. The reduction in slope angle $\theta$ relative to angle $\theta'$ is the direct result of employing a 1:1 lift ratio between follower 24 and cutter 28 and a 2:1 ratio between the axial lengths of master cam 6 and work-piece 12. It should be noted that the higher (7:4) nominal diameter ratio and the lower (1:1) lift ratio together coact to reduce the surface contour slope in planes perpendicular to the arbor axis in the same manner that the higher (2:1) axial length ratio and the lower (1:1) lift ratio together coact to reduce the master cam contour slope in planes containing the arbor axis (such as the planes of the drawings of Figs. 4 and 5).

From the preceding, it can be seen that the objects of the present invention have been accomplished by the provision of an improved three dimensional cam reproducer providing for common axis arbor mounting of the master cam and the work-piece, the use of different lift, axial length, and nominal diameter ratios between the master cam and the work-piece, and by the provision of means synchronously operative with the rotation of the common axis arbor for the maintenance of a constant rate of surface cutting of the work-piece.

While the invention has been described in its preferred embodiment, it is to be understood that the words which have been used are words of description rather than of limitation and that changes within the purview of the appended claims may be made without departing from the true scope and spirit of the invention in its broader aspects.

What is claimed is:

1. A cam reproducing machine comprising first and second arbors for the respective mounting of a master cam and a work-piece, said master cam and said work-piece when finished having the same lift but different axial length, the axial length of said master cam being greater than that of said work-piece, said arbors being directly coupled to each other in tandem along a common axis to form a continuous rigid structural member, means for rotatably supporting said member adjacent the ends thereof, means for rotating said member about said axis, a main carriage translatable solely at right angles to said axis, first and second subcarriages for respectively positioning a master cam follower and a work-piece cutter, said subcarriages being mounted on said main carriage for travel along said main carriage solely in a direction parallel to said axis, constant force means for translating said main carriage to bring said follower and said cutter into respective contact with said master cam and said work-piece, and means connected to said rotating means for driving said subcarriages along said main carriage in said direction parallel to said axis at respective speeds determined by the ratio between the axial lengths of said master cam and said work-piece.

2. Apparatus as defined in claim 1 wherein said means for driving said subcarriages comprises a common lead screw having portions threaded at individual pitches for respectively engaging each of said subcarriages, the ratio between said individual pitches conforming to the ratio between the axial lengths of said master cam and said work-piece.

3. A cam reproducing machine comprising a common arbor for the mounting of a master cam and a work-piece in tandem and at a fixed distance apart along a common axis; the ratio of the nominal diameter of the master cam to the nominal diameter of said work-piece and the ratio of the axial length of the master cam to the axial length of said work-piece being greater than the ratio of the lift of the master cam to the lift of the work-piece whereby the surface slope of said master cam is less than the surface slope of said work-piece; means for rotatably supporting said arbor adjacent the ends thereof, means for rotating said arbor about said axis, a main carriage translatable solely at right angles to said axis, first and second subcarriages for respectively positioning a master cam follower and a work-piece cutter, said subcarriages being mounted on said main carriage for travel along said main carriage solely in a direction parallel to said axis, means for translating said main carriage to bring said follower and said cutter into respective contact with said master cam and said work-piece, and common lead screw means connected to said rotating means for driving said subcarriages along said main carriage in said direction parallel to said axis at respective speeds determined by said ratio between the axial lengths of said master cam and said work-piece.

4. A cam reproducing machine comprising a common arbor for the mounting of a master cam and a work-piece in tandem and at a fixed distance apart along a common axis, means for rotatably supporting said arbor adjacent the ends thereof, means for rotating said arbor about said axis, a main carriage translatable solely at right angles to said axis, first and second subcarriages for respectively positioning a master cam follower and a work-piece cutter, said subcarriages being mounted on said main carriage for travel along said main carriage solely in a direction parallel to said axis, means for translating said main carriage to bring said follower and said cutter into respective contact with said master cam and said work-piece, means connected to said rotating means for driving said subcarriages along said main carriage in said direction parallel to said axis, said first subcarriage being driven at a greater speed than said second subcarriage.

References Cited in the file of this patent
UNITED STATES PATENTS

| | | |
|---|---|---|
| 1,798,926 | Black et al. | Mar. 31, 1931 |
| 2,491,398 | Tancred | Dec. 13, 1949 |
| 2,778,280 | Trofimov | Jan. 22, 1957 |
| 2,846,638 | Suel | Aug. 5, 1958 |